(12) United States Patent
Shintani et al.

(10) Patent No.: US 9,452,579 B2
(45) Date of Patent: Sep. 27, 2016

(54) MOLD HEATING DEVICE AND TIRE VULCANIZER

(71) Applicant: MITSUBISHI HEAVY INDUSTRIES MACHINERY TECHNOLOGY CORPORATION, Hiroshima-shi, Hiroshima (JP)

(72) Inventors: Koji Shintani, Hiroshima (JP); Yoshikatsu Hineno, Hiroshima (JP)

(73) Assignee: MITSUBISHI HEAVY INDUSTRIES MACHINERY TECHNOLOGY CORPORATION, Hiroshima (JP)

( * ) Notice: Subject to any disclaimer, the term of this patent is extended or adjusted under 35 U.S.C. 154(b) by 0 days.

(21) Appl. No.: 14/759,207

(22) PCT Filed: Feb. 7, 2014

(86) PCT No.: PCT/JP2014/052891
§ 371 (c)(1),
(2) Date: Jul. 3, 2015

(87) PCT Pub. No.: WO2015/118655
PCT Pub. Date: Aug. 13, 2015

(65) Prior Publication Data
US 2016/0176135 A1    Jun. 23, 2016

(51) Int. Cl.
*B29D 30/06* (2006.01)
*H05B 1/02* (2006.01)
*H05B 3/34* (2006.01)

(52) U.S. Cl.
CPC ....... *B29D 30/0601* (2013.01); *B29D 30/0662* (2013.01); *H05B 1/023* (2013.01); *H05B 3/34* (2013.01); *B29D 2030/0674* (2013.01)

(58) Field of Classification Search
CPC .................. B29D 30/0662; B29D 2030/0674
See application file for complete search history.

(56) References Cited

U.S. PATENT DOCUMENTS 2,024,554 A    12/1935 Vogt
2,801,443 A *  8/1957 Duerksen ................ B29C 33/02
                                                    219/541

(Continued)

FOREIGN PATENT DOCUMENTS

JP    2001-158020 A    6/2001
JP    2005-271336 A    10/2005

(Continued)

OTHER PUBLICATIONS

International Search Report mailed Apr. 8, 2014, corresponding to International patent application No. PCT/JP2014/052891.

(Continued)

*Primary Examiner* — James Mackey
(74) *Attorney, Agent, or Firm* — Kanesaka Berner and Partners LLP

(57) ABSTRACT

A charging and discharging control device includes a pantograph point voltage detection unit configured to detect a pantograph point voltage of a vehicle, a charging and discharging control unit configured to charge a power storage device provided in a vehicle when the pantograph point voltage is greater than or equal to a charging voltage threshold value and discharge the power storage device when the pantograph point voltage is less than a discharging voltage threshold value, a load determination unit configured to determine whether an absolute value of load power for the vehicle is less than a load power threshold value, and a charging and discharging control change unit configured to reduce any one or more of the charging voltage threshold value, the discharging voltage threshold value, and charging/discharging impedance when the absolute value of the load power is less than the load power threshold value.

13 Claims, 9 Drawing Sheets

(56) References Cited

U.S. PATENT DOCUMENTS 8,591,212 B2 * 11/2013 Shintani .................. B29C 33/02
425/41
2012/0074133 A1 3/2012 Fujieda et al.

FOREIGN PATENT DOCUMENTS

| JP | 2008-100513 A | 5/2008 |
| JP | 2011-126044 A | 6/2011 |
| JP | 2012-187908 A | 10/2012 |
| JP | 5106782 B2 | 12/2012 |
| JP | 5302804 B2 | 10/2013 |
| TW | M281371 U | 11/2005 |
| TW | 200835383 A | 8/2008 |

OTHER PUBLICATIONS

Written Opinion mailed Apr. 8, 2014, corresponding to International patent application No. PCT/JP2014/052891.
Extended European Search Report in EP Application No. 14868724.7, dated Feb. 17, 2016.
Office Action in TW Application No. 103104263, dated Apr. 12, 2016.

* cited by examiner

MOLD HEATING DEVICE AND TIRE VULCANIZER

RELATED APPLICATIONS

The present application is a National Phase of International Application Number PCT/JP2014/052891, filed Feb. 7, 2014.

TECHNICAL FIELD

The present invention relates to a mold heating device for a mold that vulcanizes a green tire, and a tire vulcanizer using the same.

BACKGROUND ART

Tire vulcanizers that vulcanize an unvulcanized green tire have been known. The tire vulcanizers heat a green tire from the outside by heating a mold having the green tire loaded therein using a heating medium. Moreover, the tire vulcanizers heat a green tire from the inside by supplying a heating medium consisting of steam with high temperature and high heat volume and a pressurizing medium consisting of non-condensable gas, such as nitrogen gas, to the internal space of the green tire.

As a configuration in which a mold is heated, for example, PTL 1 discloses a configuration in which an electromagnetic coil is arranged on an outer peripheral side of a mold and an outer surface of the mold is inductively heated. In this configuration, a side part heating unit including the electromagnetic coil is provided on an outer peripheral part of the mold.

Additionally, PTL 2 discloses a configuration in which a flexible planar heat generating element is provided on an outer peripheral side of a mold, and an outer surface of the mold is heated by the heat generating element.

CITATION LIST

Patent Literature

[PTL 1] Japanese Patent No. 5302804
[PTL 2] Japanese Unexamined Patent Application Publication No. 2011-126044

SUMMARY OF INVENTION

Technical Problem

Meanwhile, since tires to be valcanized have various sizes and are various types, the types of tire molds have increased.

For this reason, for example, in the configuration illustrated in PTL 1, the side part heating unit including the electromagnetic coil is provided on the outer peripheral part of the mold so as to be able to cope with the various molds.

However, in this configuration, the number of parts of the side heating unit including the electromagnetic coil increases, and substantial cost is required.

Additionally, in the configuration illustrated in PTL 2, induction-heating coils or the flexible planar heat generating elements should be attached to all owned tire molds, respectively. As a result, the number of induction-heating coils or flexible planar heat generating elements to be prepared has increased, and substantial cost is required.

An object of the invention is to provide a mold heating device and a tire vulcanizer that can achieve cost reduction.

Solution to Problem

According to a first aspect of the invention, there is provided a mold heating device for heating a mold that vulcanizes a tire. The mold heating device includes an electrothermal heater that has a heating wire disposed therein, has flexibility, and is wound around a peripheral surface of the mold; and a coupling part that couples end parts of the electrothermal heater together in a circumferential direction so that the circumferential length of the electrothermal heater can be changed.

According to a second aspect of the invention, in the mold heating device of the first aspect, the electrothermal heater may be configured to include a plurality of split belts that have a heating wire disposed therein and have flexibility, and end parts of the split belts may serve as the coupling parts.

According to a third aspect of the invention, in the mold heating device of the second aspect, the coupling part may be capable of changing the spacing between the split belts to be coupled together.

According to a fourth aspect of the invention, in the mold heating device of the third aspect, the coupling part may be constituted of an extendable member capable of being extended and compressed in the circumferential direction.

According to a fifth aspect of the invention, in the mold heating device of the third aspect, the coupling part may be constituted of a screw member that extends in the circumferential direction.

According to a sixth aspect of the invention, in the mold heating device of any one of the second aspect to the fifth aspect, the electrothermal heater may include a plurality of stages of the split belts in a height direction of the mold.

According to a seventh aspect of the invention, in the mold heating device of the sixth aspect, the electrothermal heater may be adapted such that arrangements, in the circumferential direction, of the split belts that are adjacent to each other in the height direction different from each other.

According to an eighth aspect of the invention, in the mold heating device of any one of the first aspect to the seventh aspect, the electrothermal heater may be capable of changing a range in which an electric current is made to flow in the circumferential direction.

According to a ninth aspect of the invention, in the mold heating device of any one of the first aspect to the eighth aspect, the density distribution of the heating wire in the electrothermal heater may be changed such that the amount of heat generation on an end part side in the circumferential direction becomes larger than the amount of heat generation on a middle side in the circumferential direction.

According to a tenth aspect of the invention, in the mold heating device of any one of the first aspect to the ninth aspect, a heat insulating material may be provided on an outer peripheral side of the electrothermal heater.

According to an eleventh aspect of the invention, in the mold heating device of any one of the first aspect to the tenth aspect, a fixing part that fixes the electrothermal heater to a peripheral surface of the mold may be included.

According to a twelfth aspect of the invention, in the mold heating device of the eleventh aspect, the fixing part may fix the electrothermal heater to the peripheral surface of the mold so as to cover the electrothermal heater.

According to a thirteenth aspect of the invention, there is a tire vulcanizer including a mold that vulcanizes a tire; and the mold heating device of any one of the first aspect to the twelfth aspect.

Advantageous Effects of Invention

According to the above-described mold heating device and tire vulcanizer, even in a case where the external diameter dimension of the mold varies, the electrothermal heater can be shared and used, and cost reduction can be achieved.

DESCRIPTION OF EMBODIMENTS

First Embodiment

Figure 1:
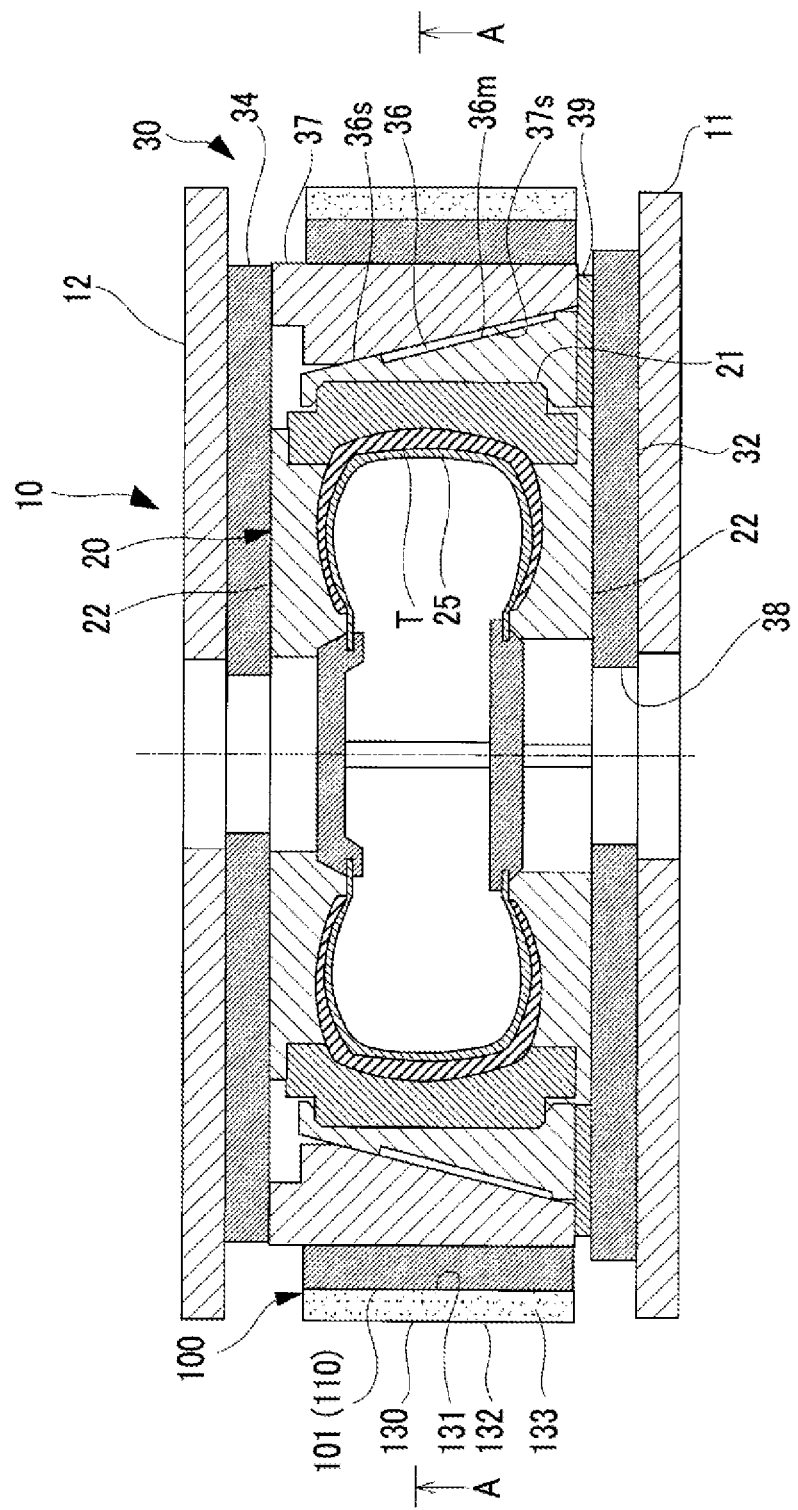
FIG. 1 is an elevational sectional view illustrating the configuration of a mold heating device and a tire vulcanizer in a first embodiment of the invention.
Figure 2:
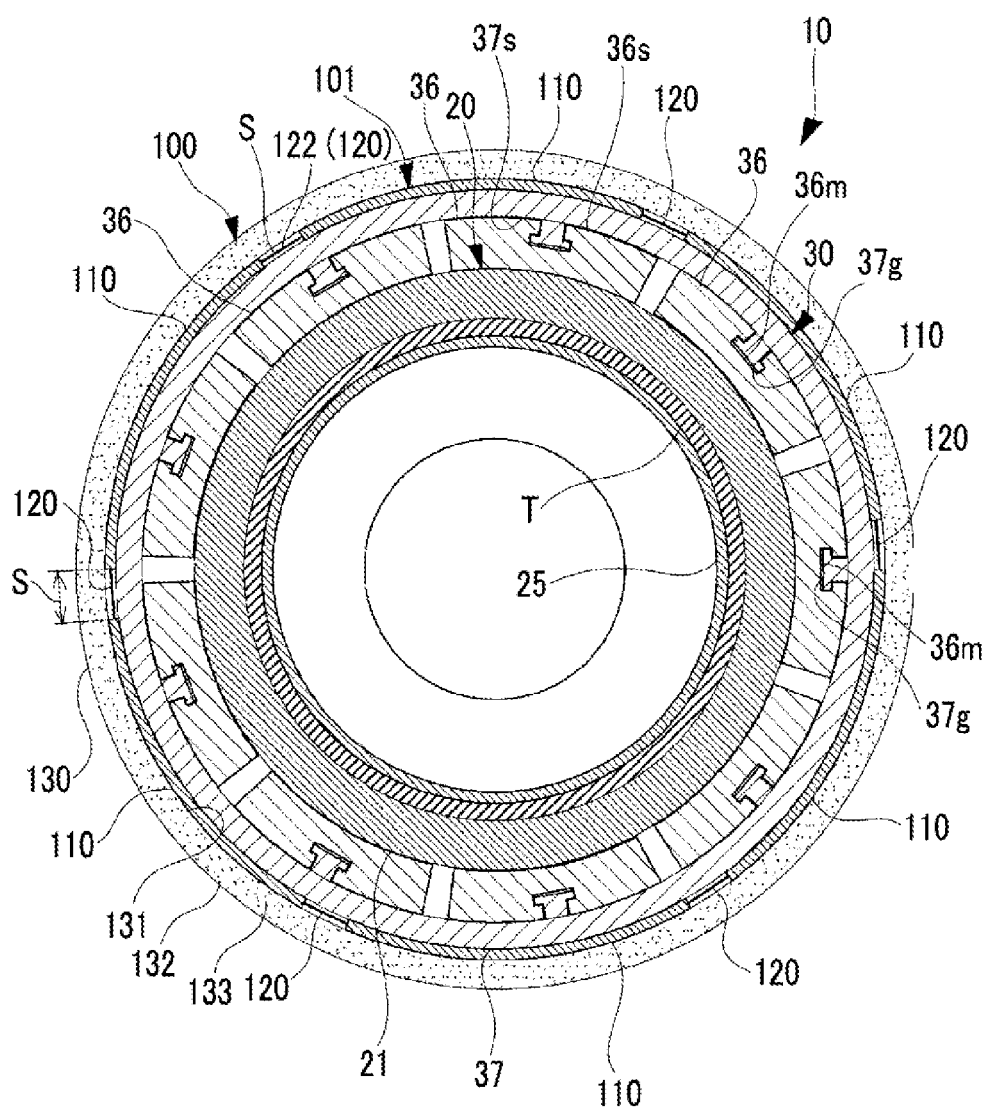
FIG. 2 is a cross-sectional view, taken along line A-A of FIG. 1, of the mold heating device and the tire vulcanizer in the first embodiment of the invention.

FIG. 1 is a sectional view of a container section of a tire vulcanizer in a first embodiment of the invention. FIG. 2 is a plan cross-sectional view of the container section of the tire vulcanizer in the first embodiment of the invention.

The tire vulcanizer 10 vulcanizes and molds an unvulcanized tire T. The tire vulcanizer 10 in this embodiment vulcanizes the tire T in a posture in which an axis thereof faces an upward-downward direction.

As illustrated in FIGS. 1 and 2, the tire vulcanizer 10 includes a mold 20, a container 30 that encapsulates the mold 20, and a mold heating device 100.

The mold 20 includes a tread mold part 21 and a sidewall mold part 22.

The tread mold part 21 forms a tread part and a shoulder part of the tire T. The tread mold part 21 is split into a plurality of pieces in a circumferential direction of the tire T.

The sidewall mold part 22 forms a sidewall part of the tire T. The sidewall mold parts 22 are respectively provided at the positions of both end edges of the tread mold part 21 in an upward-downward direction.

The container 30 is provided on a lower heating plate 11 of the tire vulcanizer 10. The lower heating plate 11 forms an annular plate shape. The container 30 includes a bottom plate 32, an upper disk 34, a segment 36, and an outer ring 37.

The bottom plate 32 is fixed to the lower heating plate 11. The bottom plate 32 is formed in an annular plate shape. The bottom plate 32 integrally has a lower sidewall mold part 22 on an upper surface thereof.

The center mechanism including a bladder 25 (rubber bag) into which a pressurizing heating medium for vulcanizing a green tire is introduced is installed in respective central openings 38 of the annular plate-shaped lower heating plate 11 and the bottom plate 32.

The upper disk 34 is formed in an annular plate shape. The upper sidewall mold part 22 is integrally provided on a lower surface of the upper disk 34.

The upper disk 34 is integrally provided on a lower surface of an upper heating plate 12 of the tire vulcanizer 10. The upper heating plate 12 is driven so as to be lifted and lowered in the upward-downward direction by a lifting device (not illustrated). The upper heating plate 12 is also formed in an annular shape. Accordingly, the upper sidewall mold part 22 provided integrally with the upper disk 34 is lifted and lowered by the lifting device (not illustrated).

A plurality of the segments 36 are provided at intervals in the circumferential direction on an outer peripheral side of the tread mold part 21. Each segment 36 is integrally fixed to an outer peripheral surface of each tread mold part 21 with a bolt (not illustrated).

The plurality of segments 36 are respectively provided on a guide plate 39 fixed on the bottom plate 32 so as to be movable in a radial direction.

An outer peripheral surface 36s of each segment 36 is formed so as to gradually spread downward to the outer peripheral side from above. The outer peripheral surface 36s of each segment 36 includes a groove 36m that is continuous in the upward-downward direction and has a T-shaped section.

The outer ring 37 is formed in an annular shape. The outer ring 37 is provided on outer peripheral sides of the plurality of segments 36 provided in the circumferential direction. The outer ring 37 is fixed to the lower surface of the upper disk 34. Accordingly, the outer ring 37 is lifted and lowered integrally with the upper heating plate 12 by a lifting mechanism (not illustrated).

The outer ring 37 has, on an inner peripheral surface thereof, an inner-peripheral-side inclined surface 37s that gradually spreads downward to the outer peripheral side from above. A T-type guide 37g is formed at a position corresponding to each segment 36 on the inner-peripheral-side inclined surface 37s. The T-type guide 37g is inserted into the groove 36m of each segment 36.

If the outer ring 37 is lowered, the inner-peripheral-side inclined surface 37s and the outer peripheral surfaces 36s of the respective segments 36 are slidable on each other. Then, the outer peripheral surfaces 36s of the respective segments 36 are pressed to a radial inner peripheral side by the inner-peripheral-side inclined surface 37s. Accordingly, the respective segments 36 move to the radial inner peripheral side. Additionally, if the outer ring 37 is lifted, the T-type guides 37g move upward while meshing with the grooves 36m of the segments 36. Then, the respective segments 36 are pulled to a radial outer peripheral side by the T-type guides 37g. Accordingly, the respective segments 36 move to the radial outer peripheral side.

That is, the tread mold parts 21 supported by the respective segments 36 are reciprocated in the radial direction by lifting and lowering the outer ring 37 using the lifting mechanism (not illustrated). In other words, the plurality of tread mold parts 21 that are arranged in the circumferential direction are expanded and compressed in the radial direction by lifting and lowering the outer ring 37 using the lifting mechanism (not illustrated).

Figure 3:
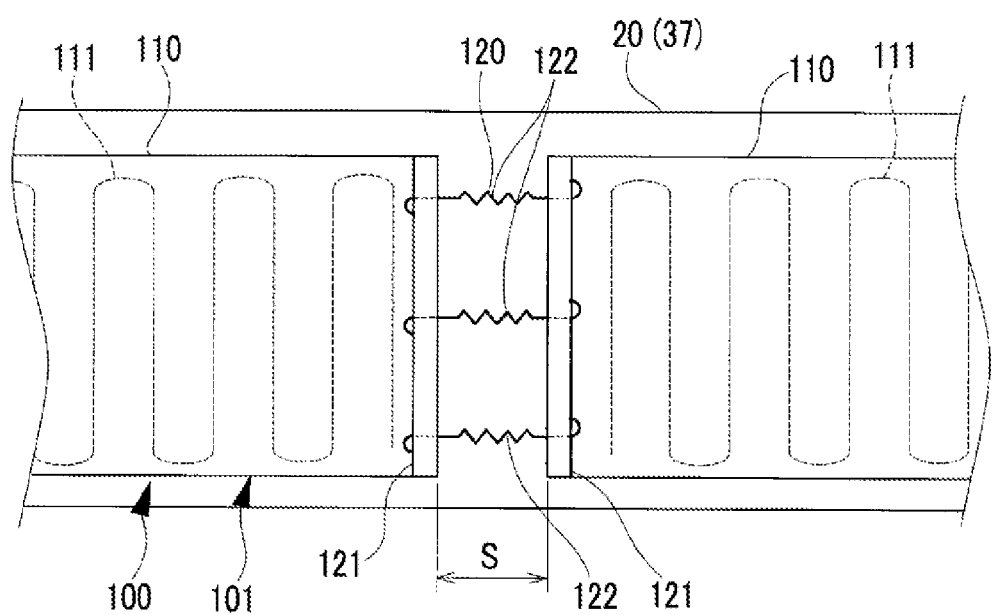
FIG. 3 is a view illustrating the configuration of the mold heating device in the first embodiment of the invention, and is a view when part of the mold heating device is seen from an outer peripheral side of the mold.

FIG. 3 is a view illustrating the configuration of the mold heating device, and is a view when part of the mold heating device is seen from an outer peripheral side of the mold.

As illustrated in FIG. 3, the mold heating device 100 includes an electrothermal heater 101 wound around a peripheral surface of the mold 20. The electrothermal heater 101 includes a plurality of split belts 110 and a coupling part 120.

Each split belt 110 is formed in a belt shape with a predetermined width. The split belt 110 is made of materials within which a heating wire 111 is disposed and that have flexibility, for example, rubber-based materials, glass fabrics, or the like.

As such a split belt 110, for example, rubber heaters, ceramic heaters, element heaters, glass fabric heaters, or the like can be used. Such a split belt 110 is provided for the peripheral surface of the mold 20, and specifically, is provided along the outer peripheral surface of the outer ring 37 of the container 30. The plurality of split belts 110 are arranged over the whole circumference of the mold 20. That is, at least two split belts 110 may be provided. In this state, a spacing S is formed between the split belts 110 and 110 that are adjacent to each other in the circumferential direction.

Here, for example, the same number of split belts 110 as the number of the segments 36 may be provided, and the split belts 110 may be provided at positions that face the respective segments 36. Additionally, a greater number of split belts 110 than the number of the segments 36 or a smaller number of split belts 110 than the number of the segments 36 may be provided.

The external diameter of the mold 20 varies according to the size of the tire T to be vulcanized. Therefore, the dimension of the spacing S between the split belts 110 and 110 varies according to the circumferential length of the outer peripheral surface of the outer ring 37 of the mold 20. Accordingly, the electrothermal heater 101 can be fixed to the peripheral surface of the mold 20 by changing the circumferential length of the electrothermal heater 101.

The coupling parts 120 are provided at the both end parts of the split belt 110. The coupling part 120 couples together the split belts 110 and 110 that are adjacent to each other in the circumferential direction. Additionally, the coupling part 120 is able to change the spacing S between the split belts 110 and 110 to be coupled. As such a coupling part 120, extendable members capable of being extended and compressed in the circumferential direction are used. This embodiment includes spring members 122 as the coupling part 120. The spring members 122 are locked to latching parts 121 that are respectively formed at end parts of the split belts 110 and 110 that are adjacent to each other. The latching part 121 is formed so as to be perpendicular to the surface of the split belt 110.

The circumferential length of the electrothermal heater 101 including the plurality of split belts 110 can be changed by the coupling part 120 consisting of such spring members 122.

As illustrated in FIGS. 1 and 2, the mold heating device 100 has a heat insulating material 130 on an outer peripheral side of the electrothermal heater 101. The heat insulating material 130 is formed in a cylindrical shape.

The heat insulating material 130 has metallic tubular bodies 131 and 132 on an inner peripheral part and an outer peripheral part thereof. The heat insulating material 130 between the tubular bodies 131 and 132 is filled with a heat insulating material 133 consisting of glass wool or the like.

Here, the heat insulating material 130 may be provided so as to directly come into contact with an outer peripheral surface of the electrothermal heater 101. In this case, the heat insulating material 130 can be made to function as a fixing member that fixes the electrothermal heater 101.

Additionally, the heat insulating material 130 may be provided with a gap from the outer peripheral surface of the electrothermal heater 101 on an outer peripheral side of the outer peripheral surface of the electrothermal heater 101.

According to the mold heating device 100 and the tire vulcanizer 10 of the above-described embodiment, end parts of the electrothermal heater 101 are coupled together in the circumferential direction by the coupling part 120 so that the circumferential length of the electrothermal heater 101 with flexibility can be changed. Accordingly, even in a case where the external diameter dimension of the mold 20 varies according to the size of the tire T to be vulcanized, the electrothermal heater 101 can be shared and used. Accordingly, even in a case where a number of molds 20 are present, the number of electrothermal heaters 101 can be suppressed, and cost reduction can be achieved.

Moreover, since the mold 20 is directly heated by the electrothermal heater 101, there is no heat dissipation caused by a supply pipe and a recovery pipe for a heating medium unlike cases where heating media, such as steam, are used. Therefore, heating efficiency can improve and energy saving can be achieved.

Additionally, the electrothermal heater 101 is constituted of the plurality of split belts 110, and end parts of the plurality of split belts 110 serve as the coupling parts 120. Accordingly, the electrothermal heater 101 can be easily attached to and detached from the peripheral surface of the mold 20.

Moreover, the coupling part 120 can change the spacing S between the split belts 110 to be coupled. Accordingly, the circumferential length of the electrothermal heater 101 can be easily adjusted according to the external diameter dimension of the mold 20.

Additionally, the coupling part 120 is constituted of the spring members 122 capable of being extended and compressed in the circumferential direction. Accordingly, as the spring members 122 are extended and compressed, the circumferential length of the electrothermal heater 101 can be easily adjusted. Additionally, the respective split belts 110 can be brought into close contact with the peripheral surface of the mold 20 by the pulling forces of the spring members 122. Therefore, heating using the split belts 110 can be efficiently performed.

In addition, the heat insulating material 130 is provided on the outer peripheral side of the electrothermal heater 101. Accordingly, heating using the electrothermal heater 101 can be more efficiently performed.

Meanwhile, if the electrothermal heater 101 is too close to the tire T, unevenness easily occurs in the temperature distribution in the surface of the tire T. In contrast, in this embodiment, the electrothermal heater 101 is provided on the outer peripheral side of the outer ring 37. For this reason, the tread mold parts 21, the segments 36, and the outer ring 37 are interposed between the tread parts of the tire T. Therefore, heat using the electrothermal heater 101 is uniformly radiated, and the tire T can be vulcanized with excellent quality.

MODIFICATION EXAMPLE OF FIRST EMBODIMENT

In the first embodiment, the spring members 122 are provided as the coupling part 120. However, the invention is not limited to this.

First Modification Example

Figure 4A:
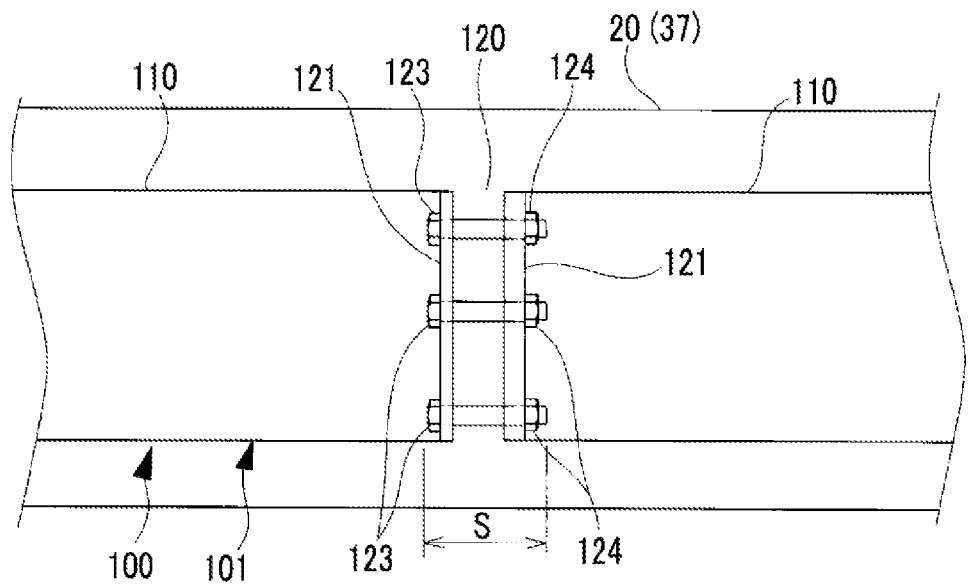
FIG. 4A is a view illustrating the configuration of a coupling part between split belts in a first modification example of the first embodiment of the invention.
Figure 4B:
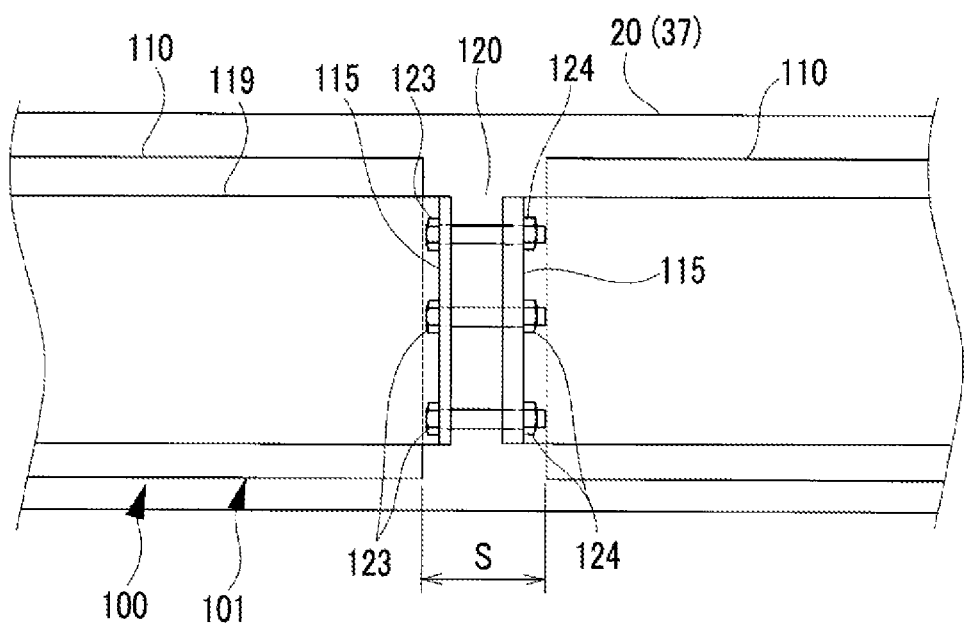
FIG. 4B is a view illustrating the configuration of a coupling part between the split belts in another aspect of the first modification example of the first embodiment of the invention.

FIGS. 4A and 4B are views illustrating the configuration of a coupling part between the split belts in the first modification example of the first embodiment of the invention.

As illustrated in FIG. 4A, bolts (screw members) 123 and nuts (screw members) 124 that extend in the circumferential direction can also be used as the coupling part 120.

The spacing S between the split belts 110 and 110 can be changed by changing the screwing positions of the nuts 124 to the bolts 123.

Additionally, as illustrated in FIG. 4B, it is not necessary to directly couple the end parts of the split belts 110 and 110 together with the bolts 123 and the nuts 124. Split belts 119 may be wound the outer peripheral sides of the split belts 110, and both ends thereof may be coupled together by the bolts 123 and the nuts 124. In this case, seat surface parts 115 orthogonal to the surfaces of the split belt 119 are formed at end parts of the split belt 119. The seat surface parts 115 of the split belts 119 are fastened to each other with the bolts 123 and the nuts 124 in a state where the seat surface parts 115 and 115 are separated from each other.

Second Modification Example

Figure 5:
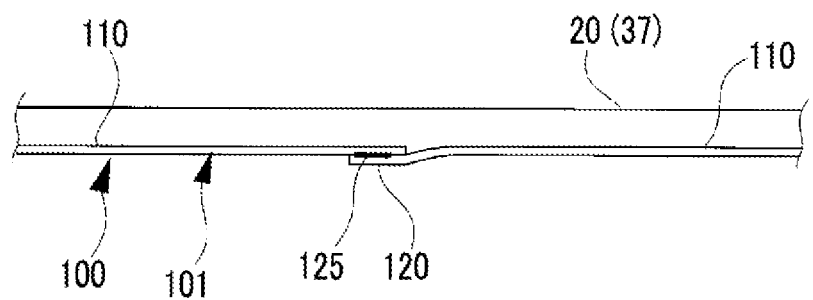
FIG. 5 is a view illustrating the configuration of a coupling part between the split belts in a second modification example of the first embodiment of the invention.

FIG. 5 is a view illustrating the configuration of a coupling part between the split belts in a second modification example of the first embodiment of the invention.

As illustrated in FIG. 5, a hook-and-loop fastener 125 may be used as the coupling part 120. In this case, the end parts of the first split belt 110 and the second split belt 110 overlap each other and are coupled together by the hook-and-loop fastener 125.

The end parts of the first split belt 110 and the second split belt 110 may not be directly coupled together by the hook-and-loop fastener 125, but a belt or the like may be wound around the outer peripheral sides of the split belts 110 and both end parts of the belt may be coupled together by the hook-and-loop fastener 125.

Third Modification Example

Figure 6:
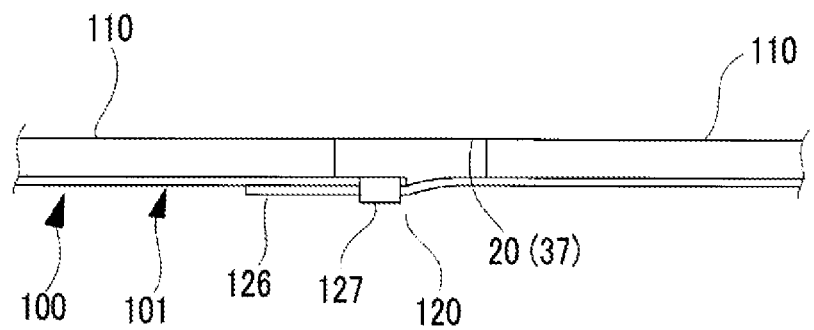
FIG. 6 is a view illustrating the configuration of a coupling part between the split belts in a third modification example of the first embodiment of the invention.

FIG. 6 is a view illustrating the configuration of a coupling part between the split belts in a third modification example of the first embodiment of the invention.

As illustrated in FIG. 6, a belt 126 that couples the split belts 110 together and a buckle 127 that adjusts the length of the belt 126 may be provided as the coupling part 120.

The belt 126 may be wound around the plurality of split belts 110, and the end parts of the first split belt 110 and the second split belt 110 may be respectively attached to the belt.

Fourth Modification Example

Figure 7:
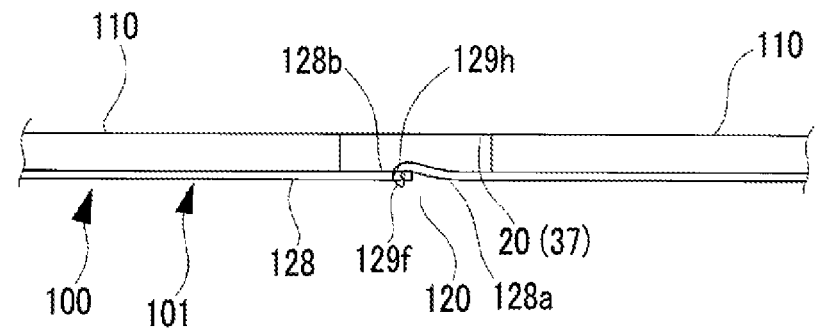
FIG. 7 is a view illustrating the configuration of a coupling part between the split belts in a fourth modification example of the first embodiment of the invention.

FIG. 7 is a view illustrating the configuration of a coupling part between the split belts in a fourth modification example of the first embodiment of the invention.

As illustrated in FIG. 7, as the coupling part 120, a hook 129f may be provided at a first end part 128a of a belt 128 that couples the split belts 110 together, and a locking hole 129h to which the hook 129f is locked may be provided at a second end part 128b. The belt 128 may be wound around the plurality of split belts 110, and the end parts of the first split belt 110 and the second split belt 110 may be respectively attached to the belt.

Although the electrothermal heater 101 is provided in the first embodiment, the configuration thereof may be provided as illustrated below, in a plurality of modification examples.

Fifth Modification Example

Figure 8:
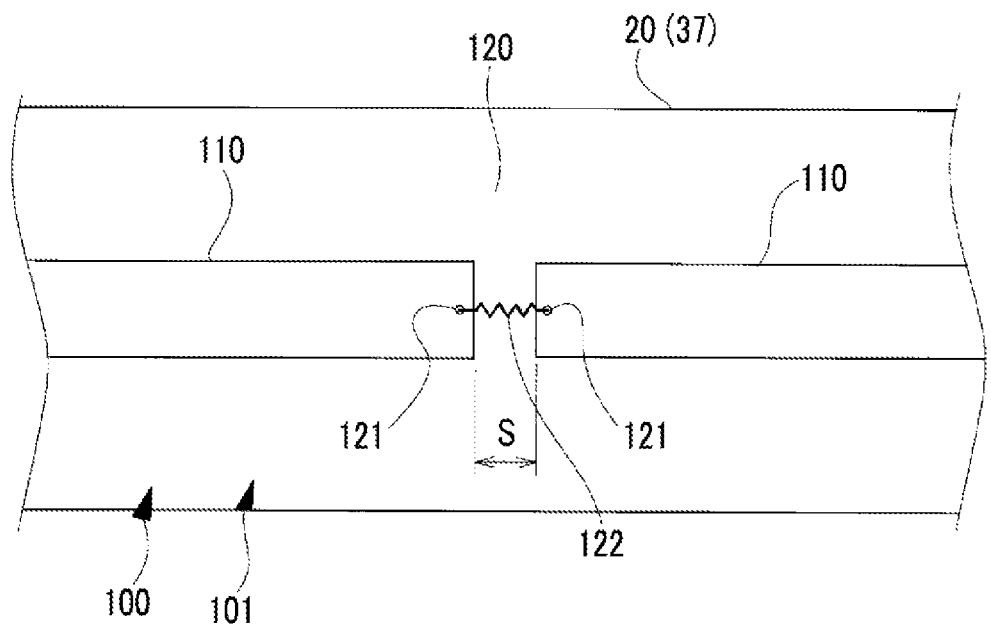
FIG. 8 is a view illustrating split belts in a fifth modification example of the first embodiment of the invention.

FIG. 8 is a view illustrating the configuration of split belts in a fifth modification example of the first embodiment of the invention.

The width dimension, in the up-down direction, of the split belts 110 that constitute the electrothermal heater 101 is not necessarily equal to the height of the outer ring 37 of the mold 20. For example, as illustrated in FIG. 8, the split belts 110 having a width dimension smaller than the height of the outer ring 37 may be provided.

Moreover, in the electrothermal heater 101, the narrow split belts 110 may be arranged in a plurality of stages in a height direction of the mold 20. The number of installed stages of the split belts 110 in the upward-downward direction (height direction) can be changed according to the mold 20 with various heights, and the electrothermal heater 101 can be installed in an optimal arrangement.

Sixth Modification Example

Figure 9:
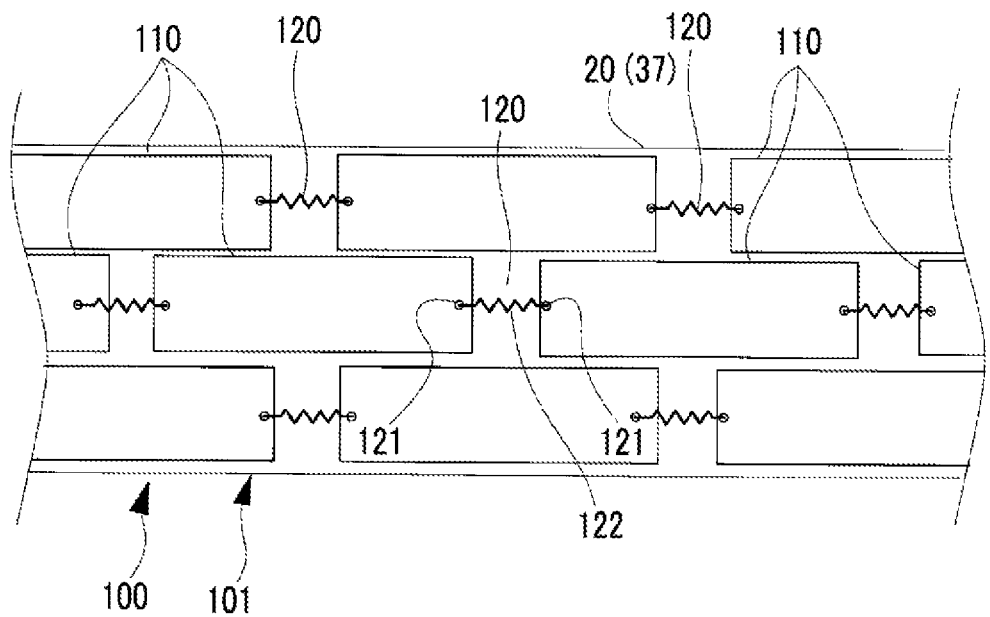
FIG. 9 is a view illustrating split belts in a sixth modification example of the first embodiment of the invention.

FIG. 9 is a view illustrating the configuration of split belts in a sixth modification example of the first embodiment of the invention.

As illustrated in FIG. 9, the split belts 110 that constitute the electrothermal heater 101 are installed in a plurality of stages in the upward-downward direction (height direction). Additionally, the split belts 110 that are adjacent to each other in the upward-downward direction (height direction) may have an alternate arrangement in which the arrangements thereof in the circumferential direction are different from each other.

Accordingly, the distribution of heating performance in the circumferential direction can be made uniform.

In the first embodiment, the electrothermal heater 101 includes the heating wires 111. However, this configuration may be an arbitrary configuration.

Seventh Modification Example

For example, each split belt 110 may have a plurality of sets of the heating wires 111 having different electric capacities. Accordingly, when heating properties are different in a preheating step of the container 30 and a vulcanizing step of the tire T, energization can be performed to perform heating after switching is made between the heating wires 111 having different electric capacities.

Eighth Modification Example

Figure 10:
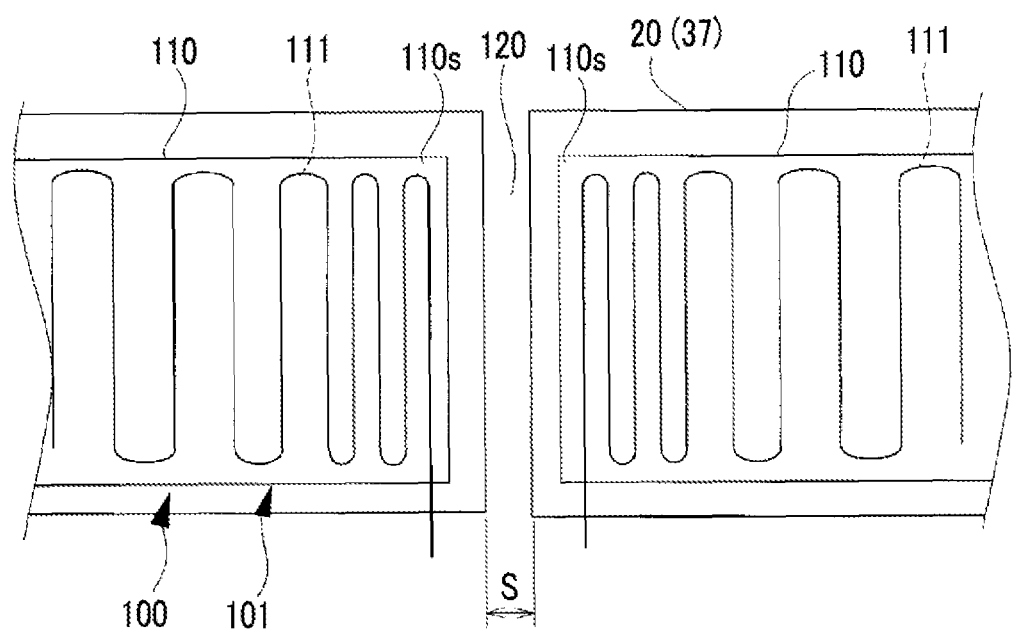
FIG. 10 is a view illustrating split belts in an eighth modification example of the first embodiment of the invention.

FIG. 10 is a view illustrating the configuration of split belts in an eighth modification example of the first embodiment of the invention.

The heating performance of the mold heating device 100 is inferior in a joining part between the split belts 110 and 110 as compared to the parts covered with the split belts 110. Thus, the electrothermal heater 101 may be adapted to be able to change the range in which an electric current is made to flow to the heating wire 111 in the circumferential direction. For example, in the electrothermal heater 101, the density distribution of the heating wire 111 may be changed such that the amount of heat generation becomes larger on an end part side in the circumferential direction than on a middle side in the circumferential direction.

As illustrated in FIG. 10, the density of the heating wire 111 is increased in an end part 110s of the split belt 110. Accordingly, heating performance becomes high in the vicinity of the end part 110s of the split belt 110, and the heating performance at the joining part of the split belts 110 and 110 can be compensated for.

Ninth Modification Example

Figure 11:
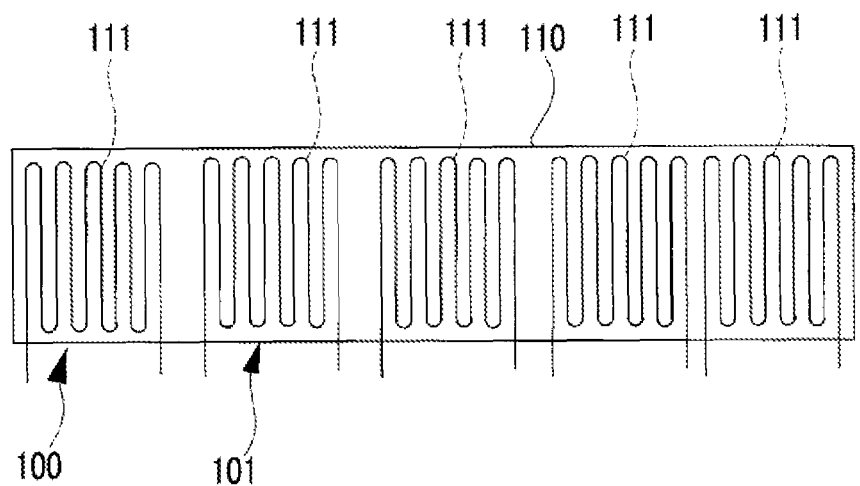
FIG. 11 is a view illustrating split belts in a ninth modification example of the first embodiment of the invention.

FIG. 11 is a view illustrating the configuration of split belts in a ninth modification example of the first embodiment of the invention.

As illustrated in FIG. 11, a plurality of sets of heating wires 111 may be provided in the circumferential direction in the split belt 110. In this case, the respective heating wires 111 are adapted to be able to individually control ON/OFF for energization and an increase or decrease in the amount of energization. Accordingly, the electrothermal heater 101 is able to change a range in which an electric current is made to flow to the heating wires 111 in the circumferential direction. Moreover, the electrothermal heater 101 is able to perform heating with suitable temperature distribution in accordance with the mold 20 on which the electrothermal heater 101 is mounted. Moreover, when the circumferential length of the mold 20 becomes short, energization to unnecessary parts of the electrothermal heater 101 may be suppressed.

Additionally, in the configurations illustrated in FIGS. 3 and 4A, the spring members 122, the bolts 123, and the nuts 124 may be electrically connected to the heating wires 111. By energizing the heating wire 111, the spring members 122, the bolts 123, and the nuts 124 can be made to generate heat to compensate for the heating performance in the joining part between the split belts 110 and 110.

Moreover, in the first embodiment, the circumferential length of the electrothermal heater 101 is changed by adjusting the circumferential length of the coupling part 120. However, the invention is not limited to this. For example, the circumferential length may be changed by changing the number of couplings between the split belts 110 that constitute the electrothermal heater 101.

In the first embodiment, the electrothermal heater 101 is configured by coupling the plurality of split belts 110. However, the invention is not limited to this. One split belt 110 that is elongated in a belt shape may be wound around the peripheral surface of the mold 20, and this split belt may be used as the electrothermal heater 101. In this case, the circumferential length of the electrothermal heater 101 is changed by changing the spacing S between end parts of the one split belt 110 using the coupling part 120.

Tenth Modification Example

Figure 12:
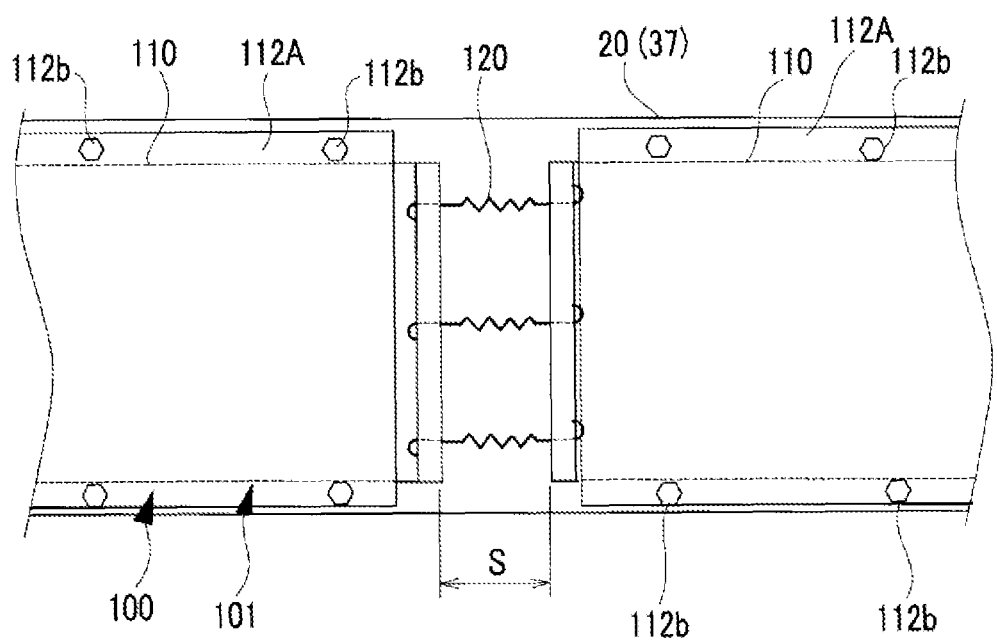
FIG. 12 is a view illustrating fixing parts of the split belts in a tenth modification example of the first embodiment of the invention.

FIG. 12 is a view illustrating fixing parts of the split belts in a tenth modification example of the first embodiment of the invention.

For example, as illustrated in FIG. 12, the electrothermal heater 101 may be fixed to the peripheral surface of the mold 20 by fixing parts 112A so as to cover the electrothermal heater 101. In this case, the fixing parts 112A are fixed to the mold 20 with fixing bolts 112b.

Additionally, the electrothermal heater 101 itself may be directly fixed to the peripheral surface of the mold 20 with the fixing bolts 112b without using the fixing parts 112A.

Second Embodiment

Next, a second embodiment of the mold heating device and the tire vulcanizer related to the invention will be described. The mold heating device illustrated in the second embodiment is different from the mold heating device of the first embodiment only in terms of including actuators for providing the split belts 110 along the peripheral surface of the mold 20. Therefore, in the description of the second embodiment, description will be made with the same reference numerals given to the same parts as those of the first embodiment, and duplicate descriptions will be omitted. That is, the description of the overall configuration of the tire vulcanizer 10 or the mold heating device 100 that is the same as the configuration described in the first embodiment will be omitted.

Figure 13:
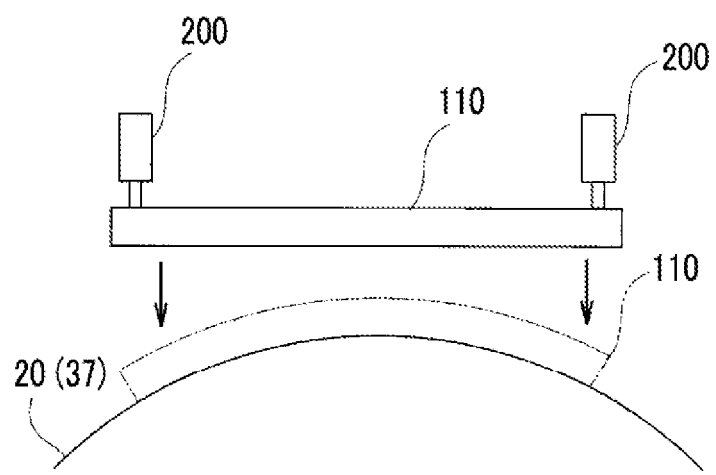
FIG. 13 is a view illustrating the configuration of a mold heating device in a second embodiment.

FIG. 13 is a view illustrating the configuration of the mold heating device in the second embodiment.

As illustrated in FIG. 13, each of the split belts 110 that constitute the electrothermal heater 101 includes actuators 200 for arranging the split belt on the peripheral surface of the mold 20.

The actuators 200 consist of air cylinders, hydraulic cylinders, or the like. Tip parts of the actuator 200 are coupled to each split belt 110.

The split belt 110 supported by such actuators 200 and 200 is arranged at positions apart from the peripheral surface of the mold 20 towards the outer peripheral side.

When the split belt 110 is arranged along the peripheral surface of the mold 20, the actuators 200 and 200 are extended. Then, the split belt 110 with flexibility is deformed so as to run along the peripheral surface of the mold 20. Accordingly, the inner periphery of the split belt 110 becomes a circular-arc with the same curvature as that of the peripheral surface of the mold 20. The electrothermal heater 101 heats the mold 20 in this state. Accordingly, replacement or mounting work of the split belt 110 can be easily and reliably performed. For example, in the electrothermal heater 101, each split belt 110 may be fixed to the peripheral surface of the mold 20 by a worker after the split belt 110 is pressed against the mold 20 by the actuators 200 and 200.

Other Embodiments

In addition, the invention is not limited to the above-described respective embodiments, and design changes can be made without departing from the concept of the invention.

For example, the heating of the mold 20 may be used in combination with a technique using heating media, such as steam.

Additionally, the heating from the upper and lower surfaces of the mold 20 may be performed using an electrothermal heater or may be performed using heating media, such as steam.

Moreover, according to the configuration of the above respective embodiments, it is possible to heat the mold 20 from the outer peripheral side surface, using the electrothermal heater 101. However, the invention is not limited to the configurations of the mold 20 as illustrated in the above respective embodiments. For example, the above configuration can also be applied to a case where a mold split into two upper and lower parts is used.

INDUSTRIAL APPLICABILITY

By changing the circumferential length of the electrothermal heater with flexibility to fix the electrothermal heater to the peripheral surface of a mold, even in a case where the external diameter dimensions of the mold varies, the electrothermal heater can be shared and used, and cost reduction can be achieved.

REFERENCE SIGNS LIST

10: TIRE VULCANIZER
11: LOWER HEATING PLATE
12: UPPER HEATING PLATE
20: MOLD
21: TREAD MOLD PART
22: SIDEWALL MOLD PART
25: BLADDER
30: CONTAINER
32: BOTTOM PLATE
33: LOWER DISK
34: UPPER DISK
36: SEGMENT
36m: GROOVE
36s: OUTER PERIPHERAL SURFACE
37: OUTER RING
37g: T-TYPE GUIDE
37s: INNER-PERIPHERAL-SIDE INCLINED SURFACE
38: OPENING
39: GUIDE PLATE
100: MOLD HEATING DEVICE
101: ELECTROTHERMAL HEATER
110: SPLIT BELT
110s: END PART
111: HEATING WIRE
112A: FIXING PART
112B: FIXING BOLT
115: SEAT SURFACE PART
119: BELT
120: COUPLING PART
121: LATCHING PART
122: SPRING MEMBER
123: BOLT (SCREW MEMBER)
124: NUT (SCREW MEMBER)
125: HOOK-AND-LOOP FASTENER
126: BELT
127: BUCKLE
128: BELT
128a: END PART
128b: END PART
129f: HOOK
129H: LOCKING HOLE
130: HEAT INSULATING MATERIAL
131: TUBULAR BODY
133: HEAT INSULATING MATERIAL
200: ACTUATOR
S: SPACING
T: TIRE

The invention claimed is:

1. A mold heating device for heating a mold that vulcanizes a tire, the mold heating device comprising:
    an electrothermal heater that has a heating wire disposed therein, has flexibility, and is wound around a peripheral surface of the mold; and
    a coupling part that couples end parts of the electrothermal heater together in a circumferential direction so that the circumferential length of the electrothermal heater can be changed.

2. The mold heating device according to claim 1, wherein the electrothermal heater is configured to include a plurality of split belts that have a heating wire disposed therein and have flexibility, and
    end parts of the split belts serve as the coupling parts.

3. The mold heating device according to claim 2, wherein the coupling part is capable of changing the spacing between the split belts to be coupled together.

4. The mold heating device according to claim 3, wherein the coupling part is constituted of an extendable member capable of being extended and compressed in the circumferential direction.

5. The mold heating device according to claim 3, wherein the coupling part is constituted of a screw member that extends in the circumferential direction.

6. The mold heating device according to claim 2, wherein the electrothermal heater includes a plurality of stages of the split belts in a height direction of the mold.

7. The mold heating device according to claim 6, wherein the electrothermal heater are adapted such that arrangements, in the circumferential direction, of the split belts that are adjacent to each other in the height direction are different from each other.

8. The mold heating device according to claim 1, wherein the electrothermal heater is capable of changing a range in which an electric current is made to flow in the circumferential direction.

9. The mold heating device according to claim 1, wherein the density distribution of the heating wire in the electrothermal heater is changed such that the amount of heat generation on an end part side in the circumferential direction becomes larger than the amount of heat generation on a middle side in the circumferential direction.

10. The mold heating device according to claim 1, wherein a heat insulating material is provided on an outer peripheral side of the electrothermal heater.

11. The mold heating device according to claim 1, further comprising:
    a fixing part that fixes the electrothermal heater to a peripheral surface of the mold.

12. The mold heating device according to claim 11, wherein the fixing part fixes the electrothermal heater to the peripheral surface of the mold so as to cover the electrothermal heater.

13. A tire vulcanizer comprising:
    a mold that vulcanizes a tire; and
    the mold heating device according to claim 1.

* * * * *